United States Patent [19]

Schrader et al.

[11] 3,750,168
[45] July 31, 1973

[54] APPARATUS FOR AIDING A PILOT IN AVOIDING A MIDAIR COLLISION BETWEEN AIRCRAFT

[75] Inventors: James H. Schrader, Newport News; Richard H. Couch, Mathews, both of Va.

[73] Assignee: The United States America as represented by the Administrator of the National Aeronautics and Space Administration, Washington, D.C.

[22] Filed: Apr. 7, 1972

[21] Appl. No.: 242,028

[52] U.S. Cl............... 343/6.5 R, 343/112 CA
[51] Int. Cl.............................................. G01s 9/56
[58] Field of Search................... 343/6.5 R, 6.5 LC, 343/112 CA

[56] References Cited
UNITED STATES PATENTS

| | | | |
|---|---|---|---|
| 2,090,359 | 8/1937 | Robinson | 343/112 CA |
| 2,568,568 | 9/1951 | Stansbury | 343/112 CA |
| 3,097,354 | 7/1963 | Blowney et al. | 343/112 CA |
| 3,181,143 | 4/1965 | Villiers | 343/6.5 LC X |
| 3,310,806 | 3/1967 | Stansbury | 343/6 R X |
| 3,447,154 | 5/1969 | Schrader | 343/6.5 R |
| 3,456,256 | 7/1969 | Perkinson et al. | 343/112 CA |

Primary Examiner—Malcolm F. Hubler
Attorney—Howard J. Osborn, John R. Manning et al.

[57] ABSTRACT

This invention is an apparatus for aiding a pilot in avoiding a midair collision between aircraft. A protected aircraft carries a transmitter, a transponder, a receiver and a data processor; and an intruding cooperating aircraft carries a transponder. The transmitter of the protected aircraft continuously transmits a signal to the transponders of all intruding aircraft. The transponder of each of the intruding aircraft adds the altitude of the intruding aircraft to the signal and transmits it back to the receiver of the protected aircraft. The receiver selects only the signal from the most hazardous intruding aircraft and applies it to the data processor. From this selected signal the data processor determines the closing velocity between the protected and intruding aircraft, the range between the two aircraft, their altitude difference and the time to a possible collision. Also, the bearing of the intruding aircraft can be determined.

11 Claims, 6 Drawing Figures

APPARATUS FOR AIDING A PILOT IN AVOIDING A MIDAIR COLLISION BETWEEN AIRCRAFT

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Year after year the aircraft density, especially around airports, increases. As a result, the probability of midair collisions increases. A midair collision is usually caused by the limited field of view of a pilot or a pilot's field of view being obscured by fog or clouds, for example. Hence, it is desirable to have a system that will warn a pilot of any other aircraft in the immediate vicinity of his own aircraft so that he can take actions to avoid a collision.

The general purpose of this invention is to provide an inexpensive device whereby the pilot of an aircraft in flight may be made aware of the existence of other aircraft which may immediately, or in the near future, become a collision hazard. It is desirable that this device provide the pilot with the range, bearing, relative altitude, range rate, and time to the closest approach of an intruding aircraft. Such a device is disclosed in U.S. Pat. No. 3,447,154. The disadvantages of this patented pilot warning system is that it is too costly for acceptance by general aviation; it does not provide relative altitude information and it does not provide sufficiently accurate range measurements.

The primary object of this invention is to modify the above-mentioned patented invention to decrease or eliminate its disadvantages. In the present invention a single frequency transmission and a single frequency reply is used instead of a dual frequency transmission and a single frequency rely to reduce the overall complexity and cost. Also, the exchange of altitude data is incorporated via the use of a modulated subcarrier and a range measurement is obtained by measuring time delay with the random modulation of the carrier. Variation in signal strength as a function of range is, however, still employed in the determination of the most hazardous intruding aircraft.

SUMMARY OF THE INVENTION

The pilot warning system that constitutes this invention includes a transmitter, a receiver and a data processor on the protected aircraft and a transponder on the intruding aircraft. The protected aircraft should also carry a transponder. The system is basically a continuous-wave Doppler radar. It operates at a transmitter power of approximately one watt to ensure a low-probability of system saturation. This low probability is due to range limiting on a signal-strength basis. The carrier frequency is frequency modulated by a recognition code generated in the transmitter by a pseudo-random process. The purpose of this recognition code is to allow all aircraft to operate simultaneously in the same frequency allocation without significant interference.

The transponder on board the intruding aircraft is simply a linear repeater which receives interrogations from other aircraft transmitters, amplifies them, shifts their frequency, and retransmits them. The recognition code on each received signal is preserved at the transponder output. In addition, a coded message that conveys the intruding aircraft altitude is applied to all transponder reply signals. The maximum transponder output power is one watt.

At the receiver, the signal strength varies inversely as the fourth power of the range between aircraft. The average received frequency differs from the average transmitted frequency by an amount equal to the offset introduced in the transponder plus the Doppler shift associated with the closing velocity between the two aircraft. There are modulation components in the received frequency which are the result of the recognition code and the altitude coded message.

In practice, there are many reply signals present at the receiver input simultaneously. Some of these replies are the result of interrogations of a number of transponders by the protected-aircraft transmitter (desired replies). Others are replies to transmitters other than the protected-aircraft transmitter (interfering replies). It is one of the functions of the receiver to distinguish between the desired replies and the interfering replies. This function is accomplished in the receiver front end by a correlation process which suppresses interfering replies and amplifies desired replies.

The overall receiver gain-versus-frequency characteristic is chosen such that the signal from the intruding aircraft which has the most hazardous combination of range and closing velocity produces the largest magnitude signal at the receiver output. Thus, the signal with the smallest modified tau (shortest possible time-to-collision) appears largest at the receiver output. This implies that degree of hazard is measured in the receiver by observing a combination of signal strength and Doppler shift.

Once the signal from the most hazardous aircraft has been selected, it is further acted upon by the data processor to obtain differential measurements of velocity, range, and altitude. The closing velocity is measured by observing the average Doppler shift with a discriminator. The range is measured by observing the time delay between the time of transmission and the time of arrival back at the receiver of the recognition code. Altitude difference is measured by comparing the decoded altitude message from the intruding aircraft with the protected-aircraft altitude. Approximate times to closest approach is determined by calculating the ratio of measured range to measured closing velocity. The addition of a second receiver channel allows the determination of intruder bearing.

DETAILED DESCRIPTION OF THE INVENTION

Figure 1:
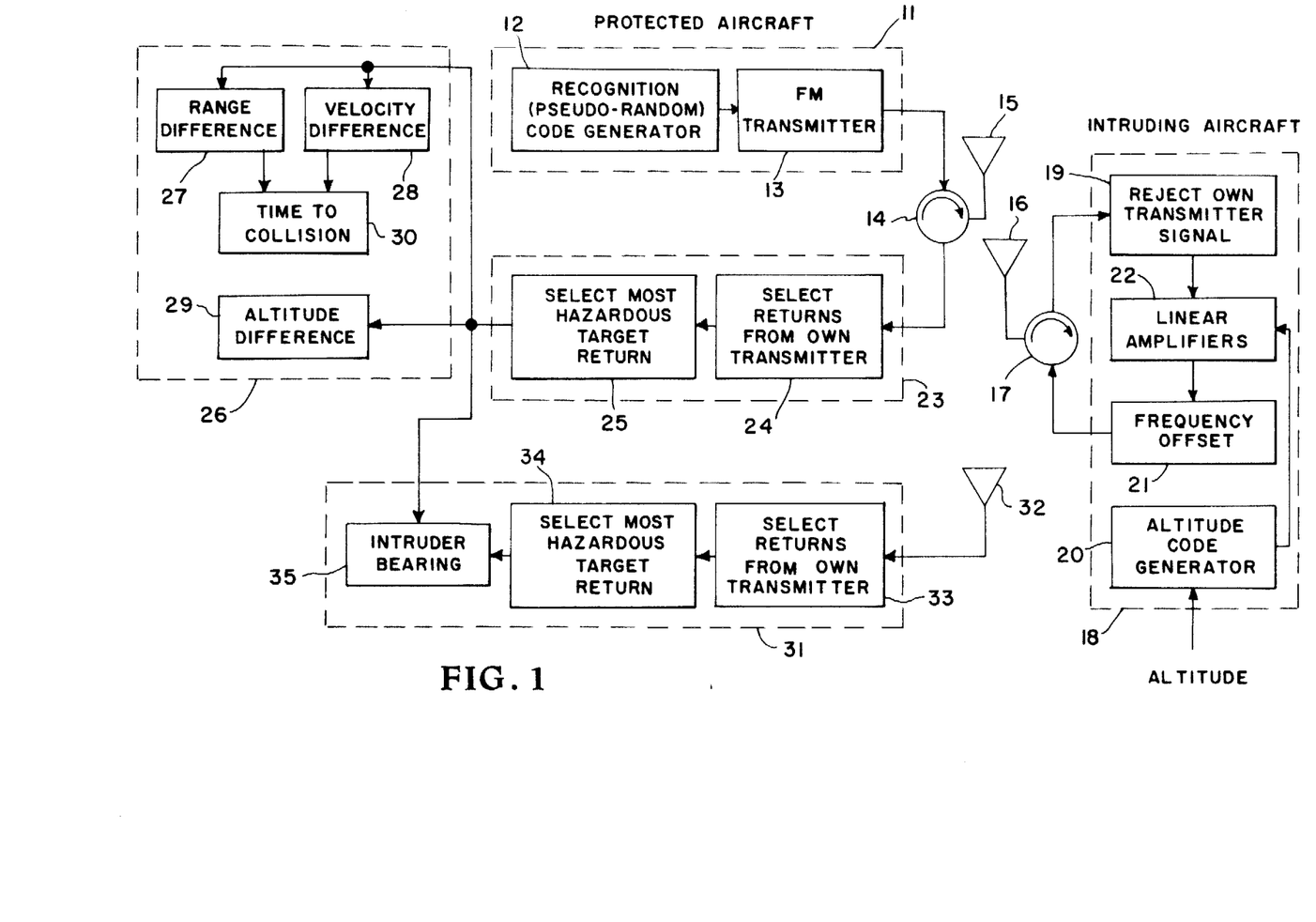
FIG. 1 is a functional block diagram of an embodiment of the invention.

Turning now to the embodiment of the invention selected for illustration in the drawings, the number 11 in FIG. 1 designates a transmitter on board the protected aircraft. The function of transmitter 11 is to continuously transmit, at a constant power level, an interrogating signal with certain spectral characteristics. The spectrum of this interrogating signal is generated by recognition (pseudorandom) code generator 12 which frequency modulates the transmitted signal by means of an FM transmitter 13. The resulting interrogating signal is applied through circulator 14 to an antenna 15.

When the interrogating signal is received by the antenna 16 of an intruding aircraft, it is applied through a circulator 17 to a transponder 18. The function of the transponder is to receive the interrogating signal and generate a reply. The transponder is simply a linear repeater which receives interrogating signals, amplifies them, and shifts their frequency. The transponder 18 includes means 19 for rejecting interrogating signals generated by the transmitter on board the same intruding aircraft as the transponder. Many aircraft may contain a transponder without a corresponding transmitter. In these cases, means 19 is omitted. The transponder also includes an altitude code generator 20 that encodes the altitude of the intruding aircraft which is added to the reply signal by means of frequency offset means 21. The spectrum of the interrogating signal is basically unaltered at the transponder output with the exception of a center frequency shift and the addition of the altitude information to the reply signal. Inasmuch as all amplification in the transponder is done by linear amplifiers 22 which operate at fixed gains, the output power level of the transponder is directly proportional to its input power level. Thus, the transponder output power is inversely proportional to the square of the range between aircraft. The output of transponder 18 is applied through circulator 17 to antenna 16.

The reply signal received by antenna 15 is applied through circulator 14 to a receiver 23. The signal strength of the reply signal received by antenna 15 varies inversely as the fourth power of the range between the protected and the intruding aircraft. The average received frequency differs from the average transmitted frequency by an amount equal to the offset frequency introduced in the transponder plus the Doppler shift associated with the closing velocity between the two aircraft. The instantaneous received frequency also differs from the instantaneous transmitted frequency by an amount that is proportional to the range. In addition, there are frequency modulation components in the received frequency which are the result of transmitters pseudorandom frequency modulation and the altitude code message.

In practice, where a number of aircraft are operating in a given area, there will be many reply signals present at the receiver input simultaneously. Some of these are desired replies resulting from interrogations, by the local transmitter, of a number of transponders. The remaining signals will be transponder replies resulting from interrogations by transmitters located in other protected aircraft. These are interfering replies. Hence, receiver 23 includes means 24 for selecting only replies to interrogations from its corresponding transmitter. This is accomplished in the receiver by a correlation process that enhances desired replies and suppresses interfering replies.

The receiver 23 also includes means 25 for selecting the most hazardous target return. This is done by selecting the overall receiver gain versus frequency characteristic such that the signal from the intruding aircraft that has the most hazardous combination of range and range rate produces the largest magnitude signal at the receiver output. Hence, the signal with the smallest tau appears largest at the receiver output. Therefore, degree of hazard is determined in the receiver itself by measuring a combination of signal strength and Doppler shift.

Once the signal from the most hazardous aircraft has been selected, it is applied to a data processor 26. The data processor includes means 27 for determining the difference in range of the protected and intruding aircraft, means 28 for determining the difference in velocity, means 29 for determining the difference in altitude, and means 30 for determining the time to possible collision. The range is determined by observing the instantaneous frequency difference between the pseudorandom noise frequency modulated transmitter signal and the pseudorandom noise frequency modulated received reply signal. This frequency difference is a function of the turnaround time delay between the interrogating and intruding aircraft and, hence, is a measure of the range. The altitude difference is determined by comparing the decoded altitude message from the intruding aircraft with the protected aircraft altitude. The time to possible collision is determined by calculating the ratio of the range to the closing velocity.

The addition of a second receiver 31 and a modified receiving antenna 32 allows the determination of intruder azimuth bearing. Receiver 31 includes means 33 and 34 identical to means 24 and 25, respectively, in receiver 23. Receiver 31 also includes means 35 that receives inputs from means 25 and 34 for determining the intruder aircraft bearing.

The transmitter 11 is a frequency modulated continuous wave source operating at a nominal carrier frequency of 5.200 GHz and an output power of 1 watt. The transmitter is shown in block diagram form in FIG. 2. The modulating voltage is obtained by first generating a pseudorandom binary sequency using a standard, maximum length, linear feedback shift register technique. This pseudorandom sequence which is generated by pseudorandom noise generator 40 is then integrated in an analog intergrator 41 mechanized through the use of an operational amplifier. The PN sequence is AC coupled to the integrator to avoid integrator saturation by the DC component of the PN sequence. Finally, the voltage from the integrator is scaled to deviate the frequency of the transmitter at a rate of 16.7 MHz/sec. The total peak-to-peak deviation of the transmitter frequency depends on the number of bits in the shift register and on the particular feedback logic employed. For a seven-bit shift register, clocked at a rate of 100 bits per second, the total deviation may vary from 2.1 MHz peak-to-peak to 3.0 MHz peak-to-peak as a function of feedback logic.

Figure 2:
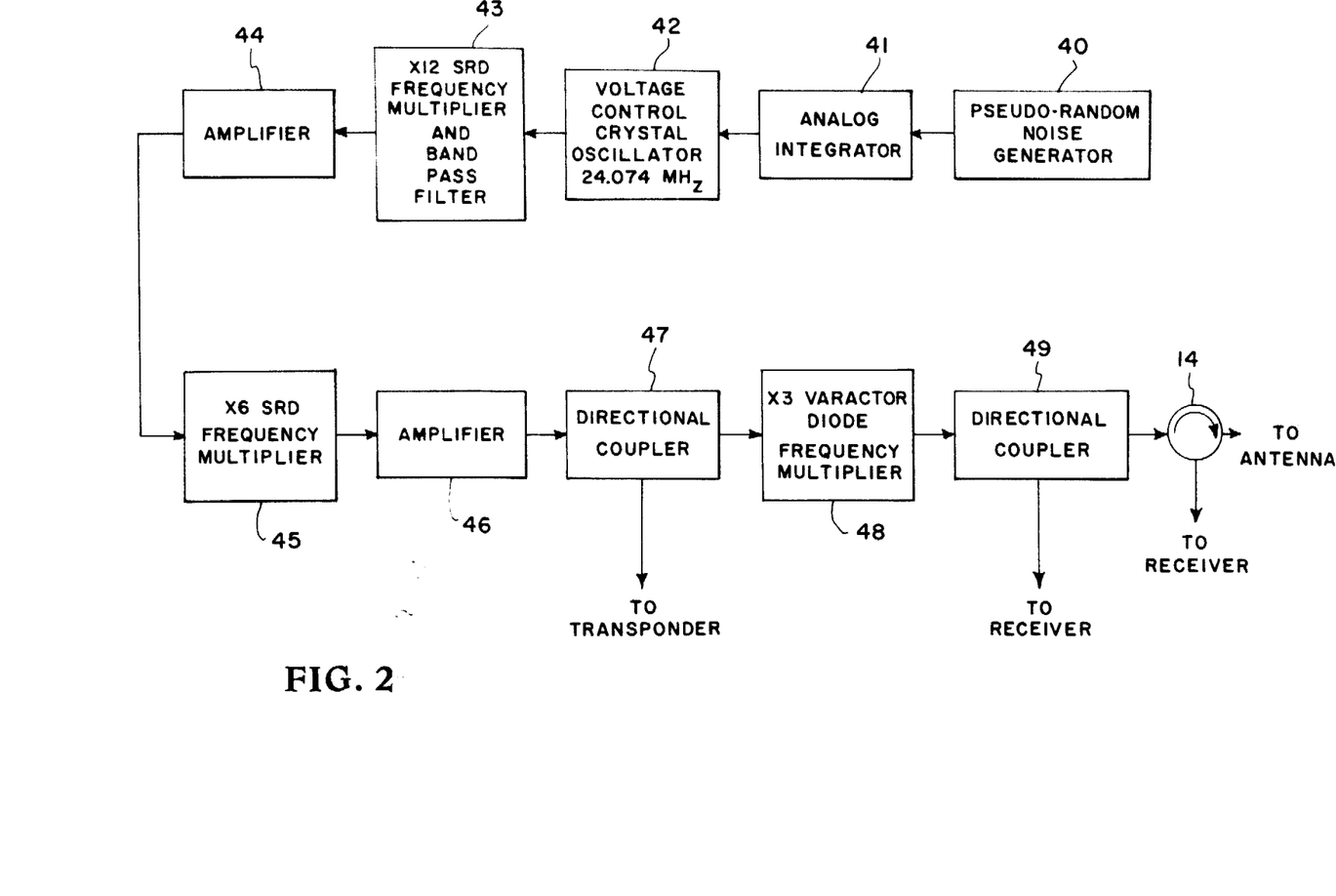
FIG. 2 is a block diagram of the transmitter used.

The integrator 41 output voltage is applied to a voltage controlled crystal oscillator 42 with a nominal unmodulated carrier frequency of 24.074 MHz. The maximum peak-to-peak frequency deviation for this oscillator is 13.9 KHz. The linearity requirement for this oscillator is ±5 percent. The oscillator 42 output signal is applied to an X12 step recovery diode frequency multiplier 43. The twelfth harmonic of the input frequency or 288.88 MHz is passed through the band-pass filter and amplified by the power amplifier 44 to a level of 3 watts. At this point the maximum peak-to-peak frequency deviation is 166.7 KHz. This signal is then applied to another X6 step recovery diode frequency multiplier 45 and the result is an output signal with a nominal carrier frequency of 1.733 GHz and a maximum peak-to-peak frequency deviation of 1.0 MHz. The amplifier 46 takes the nominal 0.5 watt power level out of X6 frequency multiplier 45 and amplifies it to a nominal 5 watts. A directional coupler 47 taps off 1 percent of the total power to be used, after suitable multiplication, as the onboard transponder local oscillator. The remaining power is applied to the X3 varactor diode frequency multiplier 48. The output is one to two watts (+30 to +33 dbm) of power at a carrier frequency of 5.200 GHz and a maximum peak-to-peak frequency deviation of 3.0MHz. Again, a small amount of the output power is tapped off through a directional coupler 49 and multicoupler arrangement to be used as the receiver local oscillator. Finally, the output signal is coupled through the circulator 14 to the interrogator antenna. The received signal from the antenna also passes through this circulator 14 on its way to the receiver front end. However, there is a 100 MHz difference between the transmitted and recieved frequencies. The circulator has 20 db of isolation and the receiver preselector filter has at least 60 db of attenuation at the transmitter frequency so that the nominal input power to the receiver due to the transmitter is −50 dbm. However, since this input is at the same frequency as the local oscillator, interference does not occur.

As stated earlier in this specification, the transponder is simply a linear repeating device which receives signals from the transmitter (at 5.200 GHz) and retransmits them (at 5.100 GHz) at power levels directly proportional to the received signal power levels. It has one other function which is to add to the replies a subcarrier, the frequency of which is proportional to the altitude of the transponding aircraft.

Figure 3:
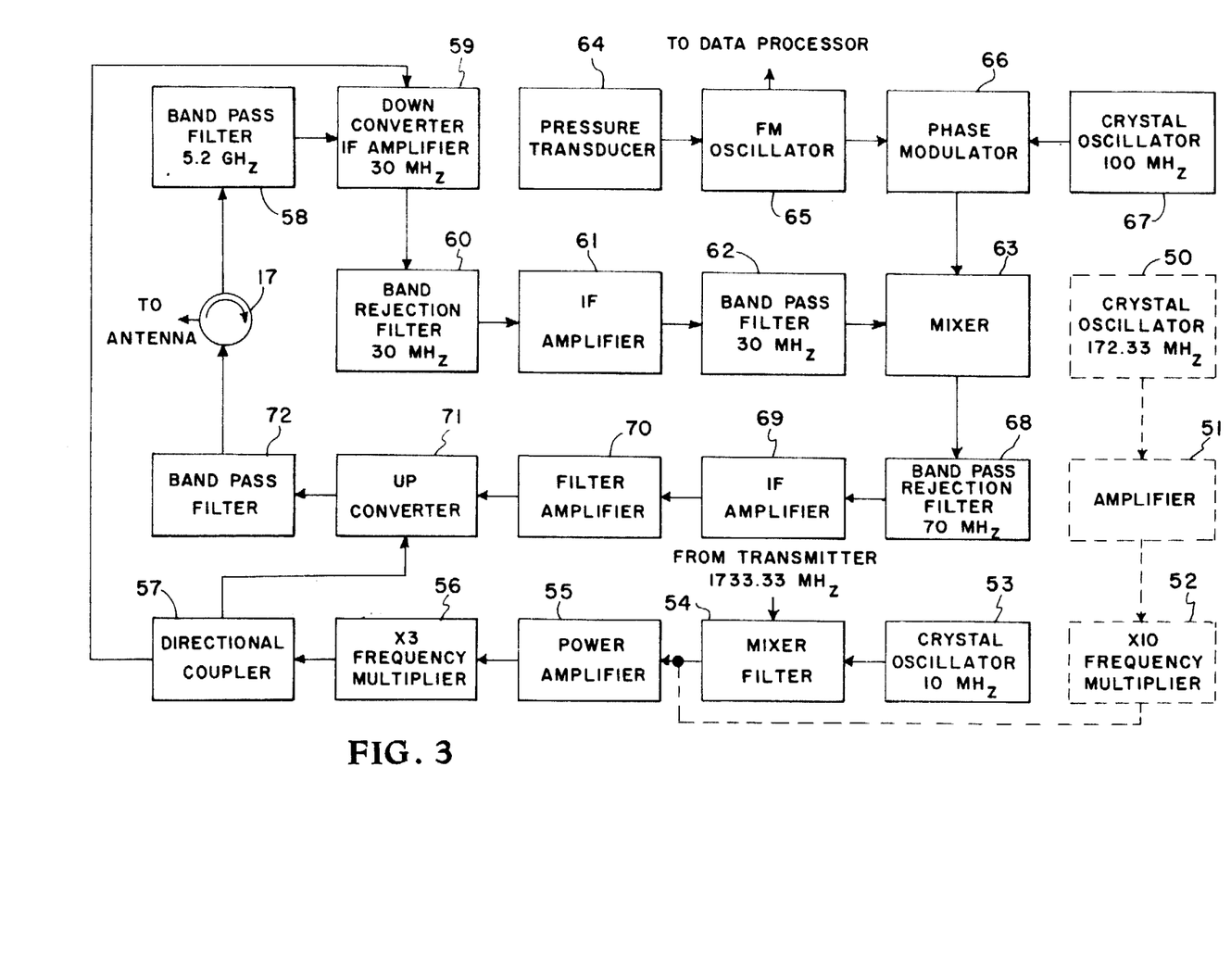
FIG. 3 is a block diagram of the transponder used.

FIG. 3 is a block diagram of the transponder. It will be noted that certain blocks on this figure are drawn in broken lines. These represent functions which are incorporated in transponders used in installations where a transmitter is not present. Blocks 50, 51, and 52 which are a crystal oscillator, an amplifier and an X10 frequency multiplier, respectively, provide a local oscillator signal of 1.723 GHz. When these blocks are installed, crystal oscillator 53 and mixer filter 54 are omitted. In addition, in transponder only installations, band rejection filters 60 and 68 are not required. In installations which include a transmitter, a 1733.33 MHz signal from directional coupler 47 is applied to mixer filter 54 where it is mixed with a 10 MHz signal from a crystal oscillator 53 to produce a 1.723 GHz signal. In either the transponder-only installation or an installation that includes a transmitter the 1.723 GHz low power local oscillator signal is applied to a power amplifier 55 which builds the power level up to 10 watts. This is followed by a high power X3 frequency multiplier 56 which produces an output of 4 watts at 5.17 GHz. In the case of a transponder-only installation, this signal is stationary at 5.170 GHz. In the case of a transponder-transmitter installation, the signal is frequency modulated in the same manner as the transmitter signal. This power is split using a directional coupler 57 with approximately 10 milliwatts going to a down converter 59 and the remainder going to an output high power up converter 71.

Again referring to FIG. 3, received signals are coupled from the antenna through the circulator 17 and a preselector band pass filter 58 to a down converter 59 where they are mixed with the local oscillator signal at 5.170 GHz from directional coupler 57 and converted down to an intermediate frequency of 30 MHz. The most stringent requirements placed on the preselector filter 58 are that it must have low insertion loss over the receiver input bandwidth (5.20 GHz ±1.5 MHz) and that it have large attenuation (60 db) at the transponder output frequency (5.10 GHz). The 30 MHz output of down converter 59 is immediately applied to a 30 MHz band rejection filter 60 in order to suppress the signal due to the local interrogating transmitter. It is desirable to locate this filter as close as possible to the down converter in order that succeeding stages of the transponder are not overdriven by the ownship transmitter signal.

After further amplification by an IF amplifier 61 and band-pass filtering by a band pass filter 62, the signals in the 30 MHz IF are mixed by a mixer 63 with a 100 MHz signal and converted to 70 MHz. The 100 MHz signal is narrow-band phase modulated by a low frequency subcarrier which conveys the altitude information. The 100 MHz signal is generated by a pressure transducer 64, an FM oscillator 65, a phase modulator 66 and a crystal oscillator 67. The pressure transucer 64 produces a signal having an amplitude which is a function of the altitude of the aircraft that has the transponder aboard. The signal from pressure transducer 64 varies the output frequency of FM oscillator 65 from 200 to 600 Hz for an altitude range of zero to 20,000 feet. The output of FM oscillator 65 is applied to phase modulator 66 to phase modulate a 100 MHz signal from crystal oscillator 67. Since the 100 MHz signal is phase modulated the 70 MHz signal at the output of mixer 63 is phase modulated in the same manner.

The 70 MHz signals from mixer 63 are applied to a band rejection filter 68. The purpose of this filter is to quiet the transponder output in the band of frequencies which corresponds to the onboard interrogators receiver pass band. This improves the signal-to-noise ratio in the receiver.

The 70 MHz signals are then further amplified by an IF amplifier 69 and filtered and amplified by a filter amplifier 70 resulting in an output of up to 200 milliwatts from the final MHz power amplifier. The 70 MHz signal is then mixed with the local oscillator signal at 5.170 GHz from directional coupler 57 in a varactor diode cavity up-converter 71. This up-converter acts as a mixer producing the sum and difference frequencies at its output. It requires a high power local oscillator signal and produces an output power at the difference frequency (5.100 GHz) which is proportional to the input signal power at 70 MHz. Power is also generated at the sum frequency (5.240 GHz) but is suppressed by the band-pass filter 72 which follows the upconverter. Finally, the output of the band-pass filter 72 is coupled through the circulator 17 to the antenna.

The function of the receiver is to receive signals from several transponders, reject those signals which are not replies to the local transmitter signal, and amplify those signals which are replies to the local transmitter signal. Further, it must examine all valid replies to the local transmitter signal and select the most hazardous reply for additional processing to determine range, closing velocity, altitude difference, approximate time-to-collision, and intruder bearing.

Figure 4:
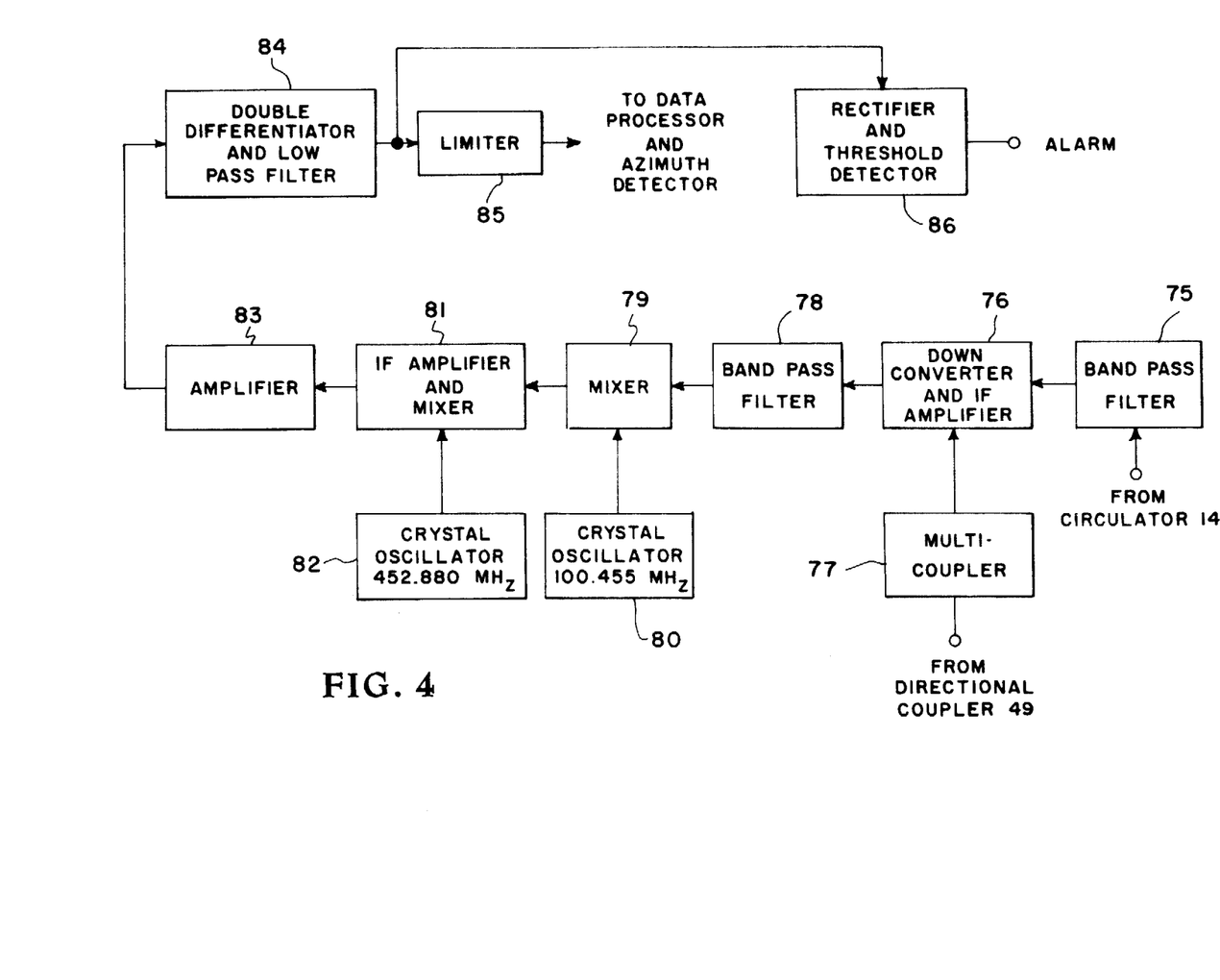
FIG. 4 is a block diagram of the receiver used.

Referring to FIG. 4, the signal enters the receiver from the transponder via the antenna-circulator combination, through the preselector band-pass filter 75 and is applied to the first down converter 76. The local oscillator for this conversion is the local transmitter signal, $F_1$, which is supplied to down converter 76 through a multicoupler 77. The signals which appear at the receiver input are $F_1 + F_0$ (a valid reply to an $F_1$ interrogation) and $F_2 + F$ (not a valid reply to an $F_1$ interrogation). The result of this first conversion is the compression of the local transmitter signal replies ($F_1 + F_0$) into a narrow bandwidth (30 KHz) around the transponder offset frequency, $F_0$ ($F_1 + F_0 - F_1 = F_0$), and the dispersion of all other replies ($F_2 + F_0$) over a wide bandwidth ($F_3 = F_2 + F_0 - F_1$) of approximately 4 to 6 megahertz.

Since the desired replies are subtracted in frequency from the transmitted signal, the frequency modulation component, due to the integrated PN sequence, is changed from a triangular function to a square wave function. The peak frequency deviation after the difference process varies with the range to the intruding aircraft. The frequency amplitude of the frequency difference $F_1 - F_2$ varies as a function of delay and, hence, as a function of range. For the 16.7 MHz modulation rate, the peak-to-peak deviation of the difference frequency will vary up to 1 KHz for a range of up to five miles.

After this first conversion, the signal spectrum is then amplified at an intermediate frequency equal to the transponder offset frequency (100 MHz) and converted to a second intermediate frequency of 455 KHz by means of a crystal oscillator 80 and a mixer 79. A band-pass filter 78 centered at 471 KHz, with a bandwidth of 30 KHz, is used to provide single sideband filtering of the 455 KHz IF signals. Undesired signals and noise are further suppressed here as are signals from aircraft which are receding (negative Doppler). Aircraft which are approaching yield a Doppler shift which raises the average received frequency above the average transmitted frequency, (ignoring the 100 MHz offset in the transponder). These replies fall into the band-pass filter passband. Receding aircraft yield reply signals which are lower in frequency than the transmitted frequency, (again ignoring the 100 MHz transponder offset), and these replies do not fall into the band-pass filter passband.

The signals are converted again by means of an IF amplifier and mixer 81, and a crystal oscillator 82 having a frequency which is slightly lower than 455 KHz, resulting in a residual offset frequency at zero closing velocity. Thus, aircraft with zero or slightly positive closing velocities will still generate positive Doppler frequencies in the baseband. It is this feature, along with the double differentiation by a double differentiator 84 in the baseband which allows for the mechanization of the modified tau threshold. The precise value of the offset frequency is found by assuming a value of modified tau and solving the modified tau equation for $\dot R$ with R set equal to zero.

The importance of the offset frequency may be more easily realized when the process of double differentiation in the base-band is considered. Since differentiators have zero response at zero frequency, some offset frequency must be added to the Doppler frequency, or zero response would occur at zero closing velocity. Now, since the signal out of the double differentiator rises in amplitude at a rate of 12db/octave, there must be some reference frequency with respect to which octaves may be measured. This frequency is chosen so that the power level out of double differentiator 84 follows the desired modified tau criterion.

The equation which defines modified tau (Tm) in terms of range (R), range rate ($\dot R$), and maximum allowable acceleration between aircraft ($u$) is $$R + \dot R Tm = \tfrac{1}{2} u Tm^2 \tag{1}$$

for $u = \tfrac{1}{3} g$, $R = 0$, and $Tm = 25$ sec  (2)

$$\dot R = \tfrac{1}{2} u Tm = 201.25 \text{ ft/sec}$$
$$\dot R = 119.16 \text{ knots}$$

To convert this offset velocity to offset frequency, it must be multiplied by the two-way Doppler scale factor in Hz/knot. For the frequencies involved (5.15 GHz) this factor is 17.7 so $$f_{\text{offset}} = 17.7 \times 119.16 = 2120.0 \text{Hz} \tag{3}$$

Hence, the final conversion oscillator frequency is $$(455,000 - 2,120) = 452.880 \text{ KHz} \tag{4}$$

After the final conversion, the signals are then amplified by amplifier 83 and applied to the double differentiator-low pass filter combination 84. This combination is simply a second order high pass filter followed by a second order low pass filter. The slope of the differentiator portion of the filter characteristic curve rises at 12 db/octave. This is the normal operating region of the filter. The low pass characteristic is included to suppress any high frequency carrier or noise from the last mixer.

The choice of single sideband filter bandwidth and double differentiator low pass filter break frequencies is primarily determined by the maximum closing velocity the system is expected to process. The maximum Doppler frequency the receiver must pass is given by $$f_{d\max} = 2130 + 17.70 \, V_{c\max} \tag{5}$$

where $F_{d\max}=$ Maximum Doppler Frequency (in Hz)
$V_{c\max}=$ Maximum Closing Velocity (in knots)
The addition of the range component of the frequency modulation requires 200 Hz of bandwidth for each nautical mile of range. The maximum altitude subcarrier signal frequency is 600 Hz. Thus, for an intruding aircraft at an altitude of 20,000 feet, five nautical miles away, with a closing velocity of 500 knots, the bandwidth requirement would be 12,570 Hz. However, it is not necessary to provide differentiation for the FM sidebands of the Doppler signals. Only the carrier need be differentiated. Therefore, the receiver IF characteristics can deviate from the 12 db/octave slope above the maximum Doppler frequency as defined in equation (5). It should be emphasized that the Doppler scale factor of 17.70 Hz/knot and the modified tau offset frequency are both functions of the transmitter carrier frequency and the transponder output frequency and are correct only for a transmitter carrier of 5.20 GHz and a transponder output of 5.10 GHz.

The spectrum of signals at the receiver output is hard limited by a limiter 85 and the strongest signal is applied to the data processor. The signal, before limiting, is also rectified and the gross power contained in the signal is compared to a preset threshold level by means of a rectifier and threshold detector 86 to determine if the modified tau setting has been exceeded and, if so, establish the existence of a hazard, by means of some appropriate alarm. Since the spectrum at the receiver output may be composed of many individual signals, none of which may be above the modified tau threshold, it may be possible to exceed the gross power threshold without actually having a single valid hazard. To prevent such an occurrence, it is possible to examine a computed value of tau ($R/\dot{R}$) using a second threshold detector in the data processor. Since this value of tau is based on the range and closing velocity for the aircraft with the strongest signal out of the receiver, the threshold detector output in the data processor can act as an inhibit to the receiver threshold detector.

Figure 5:
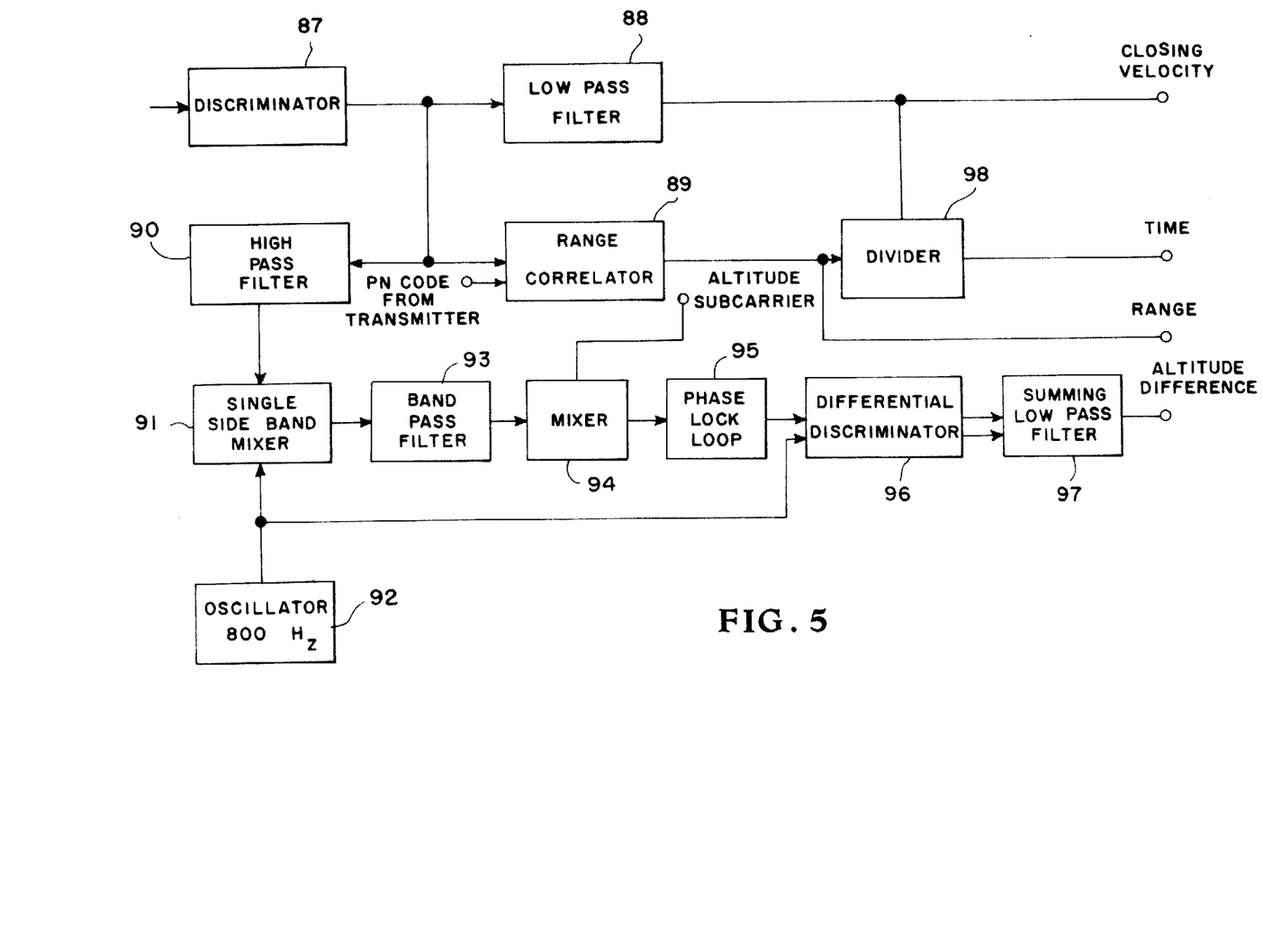
FIG. 5 is a block diagram of the data processor used.

The function of the data processor in FIG. 5 is to extract, from the captured strongest Doppler signal, the range, range rate, altitude difference, and time to closest approach of the most hazardous intruding aircraft. To do this, the Doppler signal from limiter 85 in FIG. 4 is first discriminated by a discriminator 87. The discriminator is of the pulse averaging type consisting of an input limiter for converting the signal-to-logic levels, an integrated circuit monostable multivibrator with a pulse width of 20 microseconds, and a fourth order, low pass output filter with a break frequency of 600 Hz. The discriminator output is a DC component proportional to the average Doppler frequency plus an AC component which contains the residual pseudorandom code modulation and the altitude sub-carrier.

The range rate is easily obtained by passing the discriminator output through a low pass filter 88 and suppressing the AC components. The result is a DC output signal proportional to closing velocity.

The range is obtained by AC coupling the discriminator output into a correlation detector 89 which is driven by the logic output of the pseudorandom code generator (before the integrator). By this process both the range dependent pseudorandom code component and the altitude subcarrier component of the discriminator output are applied to the correlation detector but the altitude subcarrier component is not coherent with the pseudorandom code and has little or no effect on the output. Finally, the correlation detector output is low pass filtered, and the result is an output DC voltage proportional to range.

The altitude subcarrier in the discriminator output is filtered through a high pass filter 90 with a break frequency of 200 Hz. This effectively eliminates the DC component and the PN code component of the discriminator output. However, it does not eliminate random signal dropouts which occur where the return signal passes through the notch filters in the transponder. Therefore, some provision must be made to smooth the received subcarrier frequency before the comparison with the local subcarrier is made.

The band limited signal (which will be a single line frequency between 200 and 600 Hz) is applied to a single sideband mixer 91 and mixed with an 800 Hz signal from a reference oscillator 92. The spectrum at the mixer output is confined to the band from 1000 to 1400 Hz by means of a band pass filter 93. This frequency is mixed, in a mixer 94, with the local altitude subcarrier from oscillator 65 in the transponder and the difference frequency is filtered and applied to the phase lock loop 95. Thus, the difference between the difference frequency (mixer 94 output) and the 800 Hz reference oscillator is equal to the difference between the two altitude subcarriers in magnitude and sign.

The phase lock loop 95 simply smooths the mixer 94 output and generates a signal coherent in frequency but without the dropouts present at the mixer 94 output. The phase lock loop output and the 800 Hz reference oscillator are then applied to the differential discriminator 96. The differential discriminator is simply a device with two inputs and two outputs. If the frequency on input one is higher than the frequency on input two, the difference frequency appears on output one. If the input conditions are reversed, the difference frequency appears on output two. The outputs of the differential discriminator 96 are then integrated and filtered by a summing low pass filter 97 to obtain a DC voltage proportional to the altitude difference.

It should be stated that all output low pass filters in the data processor should have the same time constant. This prevents errors in interpretation of displays due to differences in time of arrival of information at the display.

The process of calculating approximate time to closest approach of collision is one of simply dividing measured range by measured range rate. This is accomplished by an analog divider 98.

Figure 6:
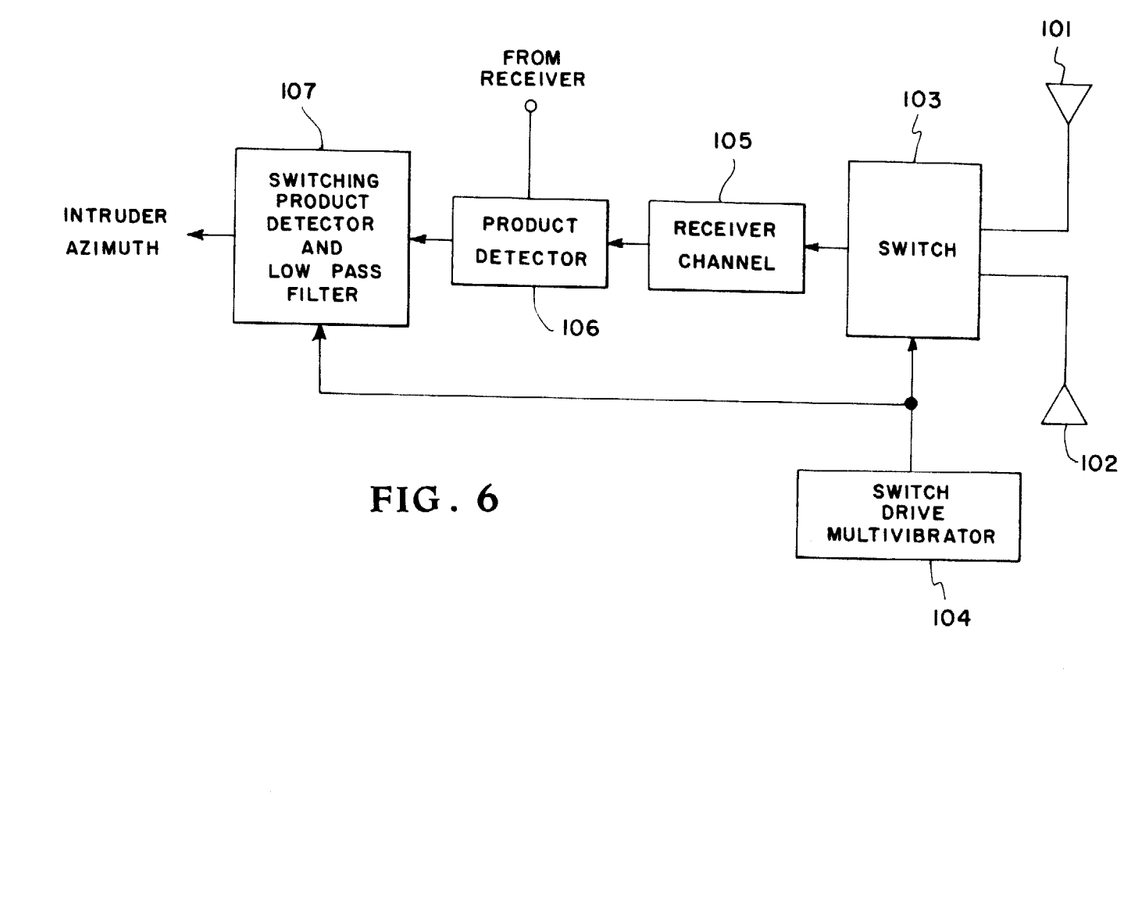
FIG. 6 is a block diagram azimuth detector used.

The azimuth detector shown in FIG. 6 includes a direction-finding antenna array consisting of antennas 101 and 102. The two antenna signals are connected to a receiver channel 105 through a single pole, double throw RF switch 103 which is driven by a low frequency square wave form switch drive multivibrator 104. Receiver channel 105 is identical to the receiver disclosed in FIG. 4 except the rectifier and threshold detector 86 is omitted. Both receiver channels are supplied by oscillators 80 and 82, and multicoupler 77. The switching function gives the signal in receiver channel 105 a phase modulation component which is not present in the other receiver channel. After all conversion and limiting functions are accomplished in the two identical receiver channels, the two signals are multiplied together in a product detector 106. The signal from the receiver in FIG. 4 acts as a reference in this product detection process. Product detector 106 functions to suppress all modulation components common to both channels. The output of product detector 106, after low pass filtering, is an AC voltage at the frequency of multivibrator 104 with an amplitude that is proportional to the phase difference between the two antenna signals. The multivibrator 104 output is then used as a coherent source for a second product detection process by means of a switching product detector 107 which yields a bipolar DC voltage proportional to azimuth angle.

All of the different components disclosed in block diagram form in FIGS. 2–6 are well known and hence are not disclosed in detail in this specification.

The primary advantage of this invention is that it provides a low-cost efficient midair collision warning device that general aviation can afford.

It should be understood that the specific frequencies used in describing the disclosed embodiment of the invention can be different without departing from the invention.

What is claimed as new and desired to be secured by Letters Patent of the United States is:

1. Apparatus for aiding a pilot in avoiding a midair collision between aircraft comprising:
   transmitter means mounted on a protected aircraft for transmitting a single continuous wave signal;
   said transmitter means including means for frequency modulating said single continuous wave signal with a code that is unique to said transmitter means;
   transponder means mounted on each possible intruding aircraft for receiving said modulated single continuous wave signal;
   each of said transponder means including means for repeating said signal and retransmitting it;
   receiver means mounted on said protected aircraft for receiving said retransmitted signal;
   said receiver means including means for selecting only signals which are replies to signals transmitted by the transmitter on said protected aircraft and means for selecting only the retransmitted signal from the transponder on the most hazardous intruding aircraft.

2. Apparatus for aiding a pilot in avoiding a midair collision according to claim 1 wherein said means for modulating said single continuous wave signal with a code that is unique to said transmitter comprises a pseudorandom noise generator;
   means for generating a continuous wave signal; and
   means for frequency modulating said continuous wave signal with the signal from said noise generator.

3. Apparatus for aiding a pilot in avoiding a midair collision according to claim 1 wherein said transponder includes means for producing a signal proportional to the altitude of the intruding aircraft; and
   means for phase modulating said repeated signal with said altitude signal before the repeated signal is retransmitted.

4. Apparatus for aiding a pilot in avoiding a midair collision according to claim 1 wherein said means for selecting only signals transmitted by the transmitter on said protected aircraft includes means for converting the signal received by the receiver to an intermediate frequency by mixing it with said modulated transmitter signal.

5. Apparatus for aiding a pilot in avoiding a midair collision according to claim 1 wherein said transponder means includes means for generating a signal proportional to the altitude of the intruding aircraft;
   means receiving said altitude signal for producing an altitude subcarrier signal;
   means for generating an offset frequency signal;
   means for phase modulating said offset frequency signal with said altitude subcarrier signal;
   means for converting the received modulated single continuous wave signal to an IF frequency;
   means for converting said IF frequency back to the frequency band of said modulated single continuous wave signal.

6. Apparatus for aiding a pilot in avoiding a midair collision according to claim 1 wherein said means for selecting only the retransmitted signal from the transponder on the most hazardous intruding aircraft includes;
   means for accepting signals from approaching aircraft and rejecting signals from receding aircraft; and
   means for introducing a transfer characteristic to said accepted signal such that the strongest resultant signal provides a reasonable estimate of the most hazardous intruding aircraft.

7. Apparatus for aiding a pilot in avoiding a midair collision according to claim 1 including means for producing a signal to the closing velocity between the protected aircraft and the intruding aircraft from the signal produced by said receiver means.

8. Apparatus for aiding a pilot in avoiding a midair collision according to claim 1 including means for producing a signal related to the range between the protected and intruding aircraft from the signal produced by said receiver means.

9. Apparatus for aiding a pilot in avoiding a midair collision according to claim 1 including means for producing a signal related to the time to possible collision of the protected and intruding aircraft from the signal produced by said receiver means.

10. Apparatus for aiding a pilot in avoiding a midair collision according to claim 1 including means for producing a signal related to the altitude difference between the protected and intruding aircraft from the signal produced by said receiver means.

11. Apparatus for aiding a pilot in avoiding a midair collision according to claim 1 including means for producing a signal related to the bearing of the intruding aircraft relative to the protected aircraft from the signal produced by said receiver means.

* * * * *